Dec. 24, 1940.  W. E. RODLER  2,225,713
LOCOMOTIVE
Filed June 1, 1937  4 Sheets-Sheet 1

INVENTOR.
WALDO E. RODLER
BY
ATTORNEY.

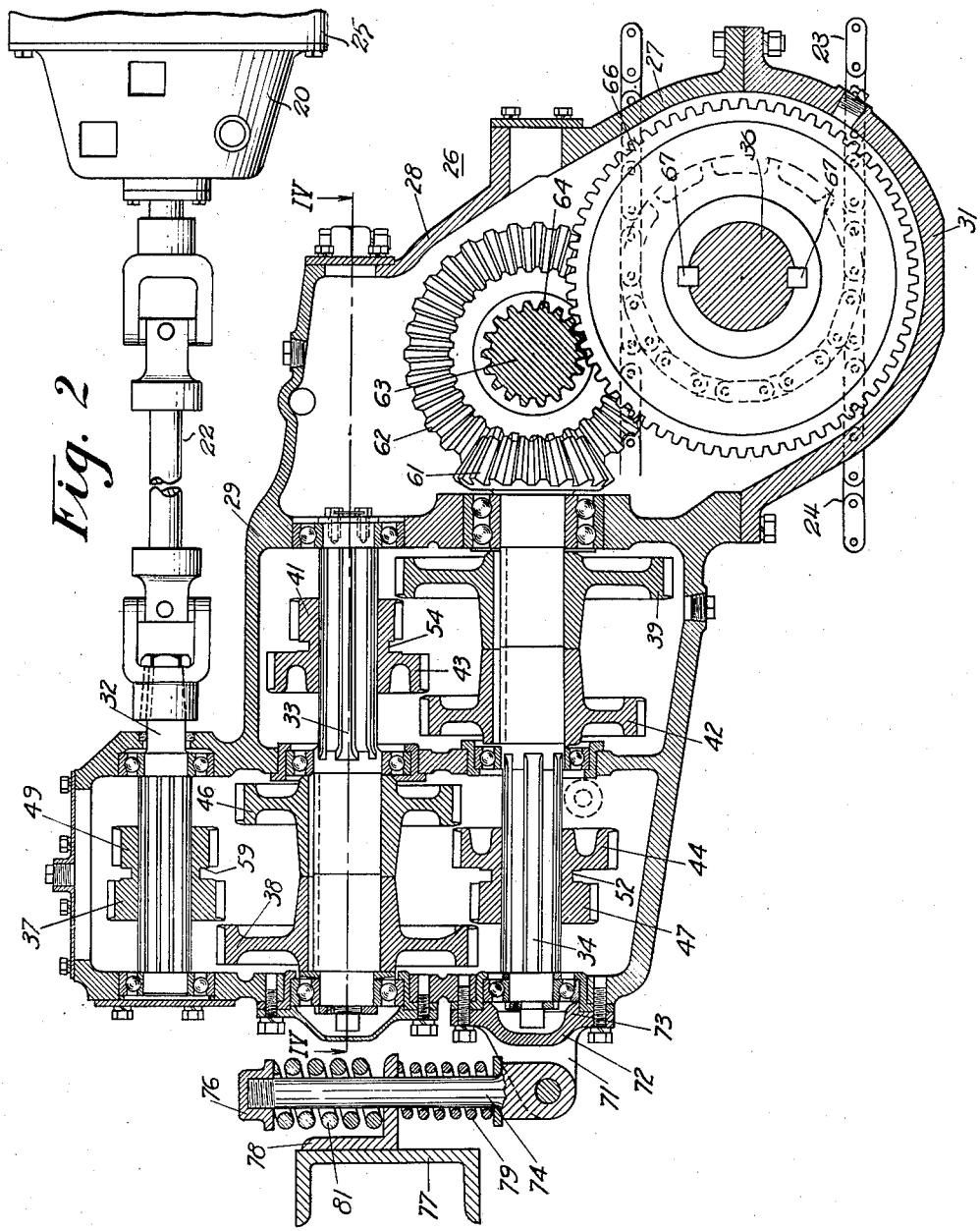

Dec. 24, 1940.  W. E. RODLER  2,225,713
LOCOMOTIVE
Filed June 1, 1937  4 Sheets-Sheet 3

INVENTOR.
WALDO E. RODLER
BY Flournoy Corey
ATTORNEY.

Patented Dec. 24, 1940

2,225,713

UNITED STATES PATENT OFFICE 2,225,713

LOCOMOTIVE

Waldo E. Rodler, Davenport, Iowa

Application June 1, 1937, Serial No. 145,721

5 Claims. (Cl. 105—62)

This invention relates to locomotives, rail cars and the like and has particular relation to drive means for such vehicles.

In relatively light locomotives of the industrial type it is customary in many cases to utilize Diesel engines or gasoline engines as the prime movers for such devices. In this way power plants are provided which are relatively small and compact and of simple construction.

In devices of this character however, it is customary to use multiple gearing, both forward and reverse, for driving the traction wheels from the prime mover. However, in the customary construction it has been the usual practice to place the transmission and clutch in a housing on the rear of the motor. This makes a compact structure but has a very serious drawback in that such structures are extremely difficult to service in the field due to the lack of facilities and because of the heavy parts which must necessarily be handled.

It has been the practice in locomotive construction to fasten the transmission to the rear of the engine or support it adjacent the rear of the engine. It was customary to drive from this transmission through a double chain to one axle and to drive other axles by means of chains from this first axle or to utilize a jack shaft with side rod connections from the transmission to the first set of wheels and other side rods from the first set of wheels to a second shaft or in still another type of transmission to place the transmission between two sets of wheels and drive each set by separate chain. If a third set of wheels are used these are driven by still another chain drive from one of the first named shafts.

In devices of this character it is frequently necessary to reline the clutch and it is necessary, in order to do this, to either move the motor ahead or move the transmission rearwardly. In dismounting these structures it was necessary either to dismount the motor and move it ahead or take off the cab portion of the structure to move the transmission back.

With these customary styles of drives extra chains were needed and adjustments were required to take up chain wear and, of course, the expense of building locomotives in this way was high by reason of the extra parts required.

It is one of the primary objects of my invention to provide a locomotive drive in which the transmission is mounted on the axle rather than on the motor or prime mover or suspended from a frame.

It is another object of my invention to provide a drive in which space is conserved by mounting the motor and the transmission above an axle with the motor located on one side of the axle and the transmission on the other.

Another object of my invention is to provide an axle mounted transmission.

Another object of my invention is to provide a readily separable transmission structure which may be dismounted and assembled part by part so that the weight of the parts is relatively low.

Another object of my invention is to provide a more direct drive for locomotives thereby eliminating several friction points required in the usual structures.

It is another object of my invention to provide a transmission in which the multiple speed, forward and reversing means and reduction gearing are disposed about the main axle of the locomotive.

Another object of my invention is to provide a transmission in which the forward and reverse and the change speeds are ahead of the speed changing and reduction gearing.

Another object of my invention is to provide a locomotive in which the transmission, clutch and such parts may be removed or repaired with a minimum of disturbance and difficulty.

Other and further features and objects of my invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 2 is a view in section of a transmission suitable for the locomotive shown in Figure 1 constructed according to an embodiment of my invention.

Figure 1:
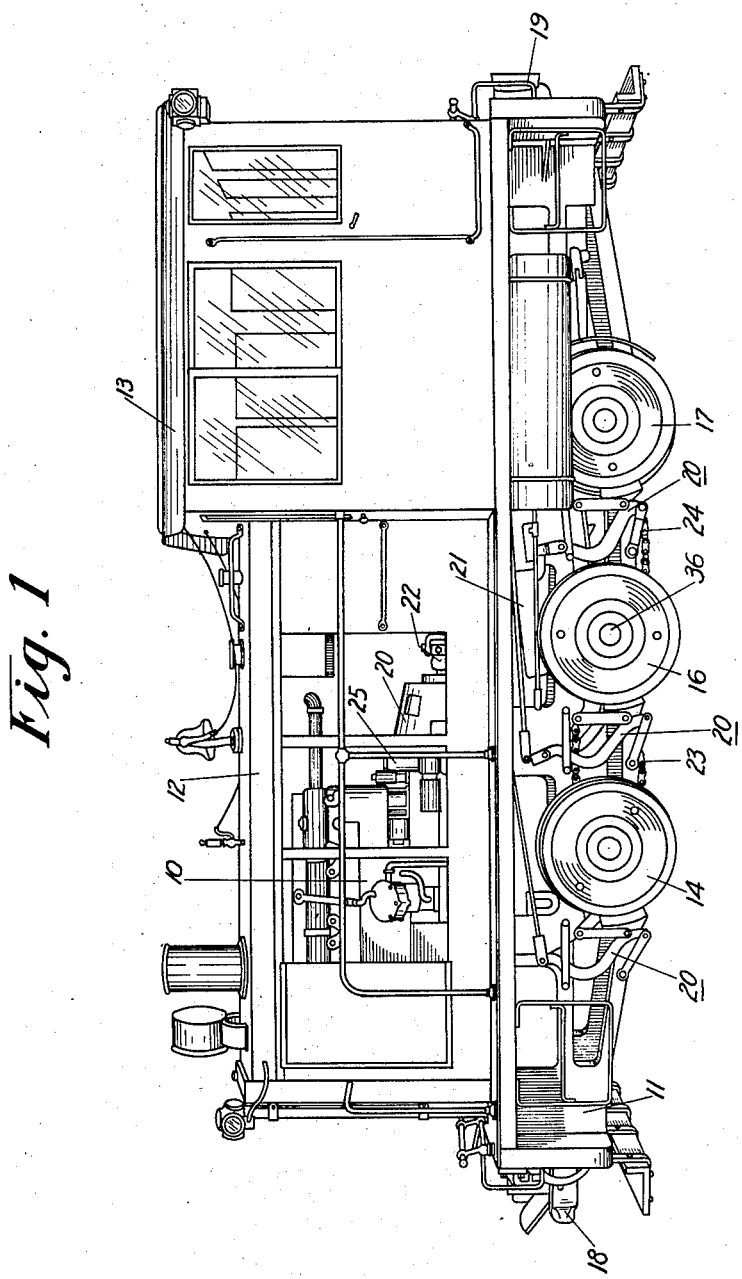
Figure 1 is a view in perspective of a locomotive constructed according to one embodiment of my invention.
Figure 4:
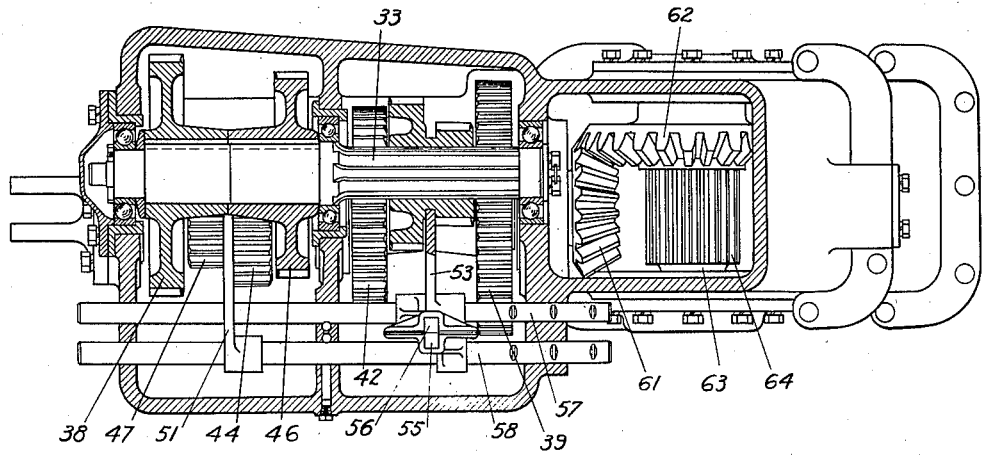
Figure 4 is a top sectional view taken along the lines IV—IV of Figure 2.

Referring now more particularly to Figure 1, a locomotive constructed according to one embodiment of my invention includes a prime mover indicated at 10, which is mounted at the forward portion of a main frame 11, and housed by the canopy 12. A cab 13 is mounted at the rear of the structure and the frame is supported on pairs of wheels 14, 16 and 17. The locomotive is coupled to the train by means of the couplers 18 and 19 in accordance with the usual practice The prime mover 10 may be a Diesel engine or gasoline engine, or even a steam engine, though this is not the usual practice in locomotives of this character. The brake rigging is indicated generally at 20.

In the locomotive here shown six wheels are employed all of which are drivers. It is preferable, in a preferred embodiment of my invention, to mount the transmission on the middle axle and drive the forward and rear axles from this middle axle. This is a preferred drive from the engineering standpoint and it is one of the advantages of my invention that the transmission may be located at this point, which is not the case in the devices of the prior art.

In a four-wheel locomotive it is the usual practice to mount the transmission above the rear wheels and drive the front wheels from the rear axle.

In Figure 1 the transmission is located at 21. The drive-in shaft for driving the transmission 21 from the motor 10 is indicated generally at 22. The chains for driving front and rear axles are indicated at 23 and 24.

Referring now more particularly to Figure 2, the transmission is housed in a multi-part housing indicated generally at 26 and comprised of a lower transmission case 27, a middle transmission case 28, and upper transmission case 29. The lower transmission case is provided with an oil pan 31, these casings being preferably split in horizontal planes at the middle transmission shaft or change-speed drive shaft 33, the lower transmission shaft or change-speed drive shaft 34 and at the main or drive axle 36, the various shafts being received in anti-friction bearings mounted in these housings.

Figure 3:
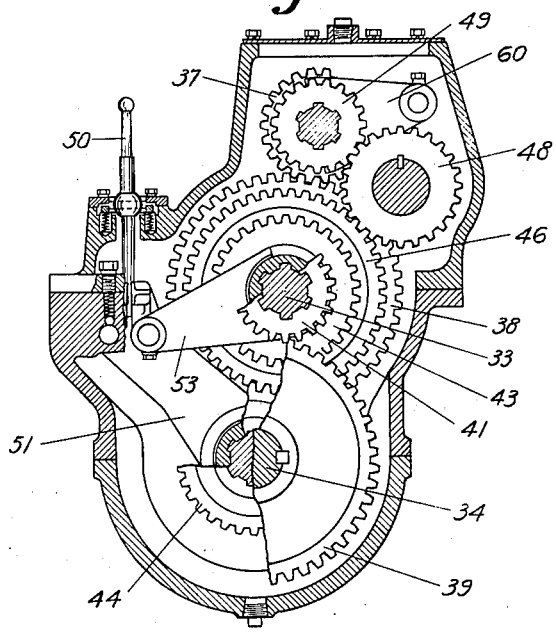
Figure 3 is an end sectional view of the transmission shown in Figure 2.
Figure 5:
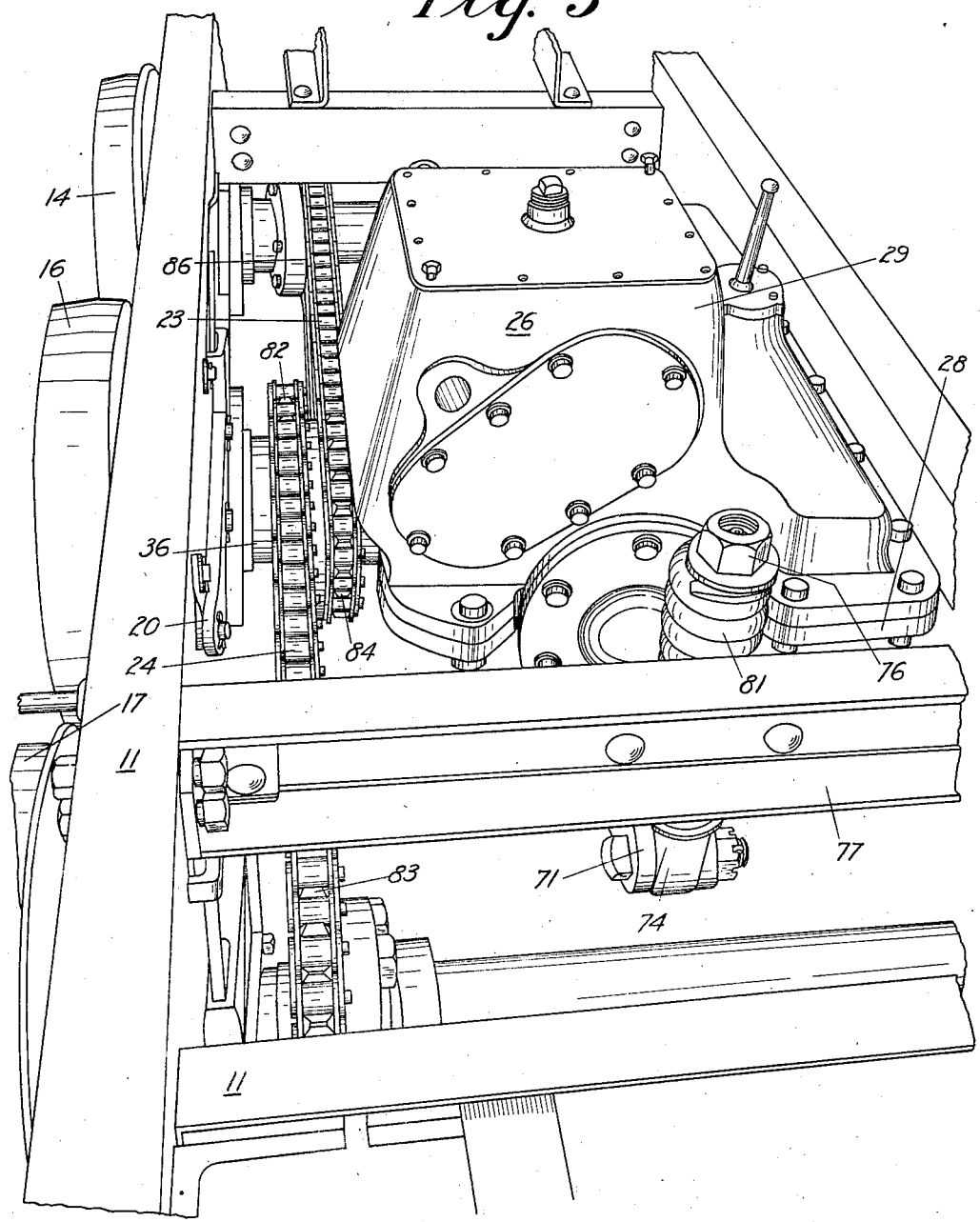
Figure 5 is a view in perspective of a transmission constructed according to an embodiment of my invention and illustrating the manner in which the transmission is mounted in the locomotive frame.

In driving forward the spur gear 37 on splined in-drive shaft 32 is meshed with spur gear 38 on shaft 33. In the transmission here shown four speeds forward and four reverse are provided. Low speed is afforded by meshing the gear 39 on shaft 34 with the gear 41 on the splined portion of shaft 33. Second speed is accomplished through meshing gear 42 with the gear 43. Third speed is afforded by means of gears 44 and 46, gears 41 and 43 being out of engagement, and fourth speed by meshing gears 47 and 38. Reverse is afforded by means of an idler gear 48 (Fig. 3) which is adapted to mesh with the gears 49 and 46, the four speeds being accomplished by means of gears 39, 42, 44 and 47 as before.

The gears 44 and 47 are shifted by one shifting fork 51 which is received in the groove 52, and shifting of the gears 41 and 43 is accomplished by another shifting fork 53 received in the groove 54. The shifting forks 51 and 53 may be shifted by the same shift lever 50 which engages in one or the other of the sockets 55 or 56, the socket 56 being engaged to shaft 57 carrying the fork 53 and the socket 55 being engaged to shaft 58 on which shifting fork 51 is mounted. The shifting of gears 49 and 37 for forward and reverse is accomplished by means of a fork 60 received in the groove 59 between these gears.

The reduction drive is accomplished by means of the bevel pinion 61 which is mounted on the end of the lower transmission shaft 34 and this bevel pinion drives a large bevel gear 62 which is mounted on the final drive pinion shaft 63. The drive shaft 63 is provided with a spur gear 64 which meshes with a large spur gear 66 which is keyed to the drive axle 36 by means of keys 67.

In accordance with the usual practice the clutch is housed in the clutch housing 20 which is mounted on the flywheel housing 25 of the engine and this clutch permits engagement and disengagement of the various gears for multiple speeds forward and reverse.

Since the transmission depends chiefly for its support on the drive axle 36 it is apparent that some means preferably should be supplied at some other point for further supporting the transmission to prevent it from rotating about the shaft 36 when power is applied. A preferred suspension means is a hose suspension system employing springs, rubber pads or other flexible means mounted on the face of the transmission housing opposite the drive shaft portion.

In a preferred embodiment of this nose suspension means I employ a nose suspension bracket 71 which is a part of the bearing cap 72. This bearing cap is bolted to the rear of the lower transmission case and the cap 72 has flanges 73 received in the transmission case to provide means for absorbing shear from the case to the cap (Figure 2). A nose suspension bolt or hanger 74 is pivotally engaged to the bracket 71 and this bolt has a nut 76 threaded on its upper end. A cross beam 77 is provided as a part of the frame 11 and this cross beam is provided with a bracket 78 which has an opening through it to receive the bolt 74. Springs 79 and 81 are provided on opposite sides of the bracket 78 and these springs are disposed on the bolt 74 in such manner that the spring 81 absorbs the driving torque in driving the locomotive forward and the spring 79 in driving it in reverse. Drive to the wheels is afforded by means of sprockets 82, 83, 84 and 86 and chains 23 and 24.

One of the marked advantages of my invention is that by having the reverse gears ahead of the speed change gears and the final reduction gears, wear is equalized on both profiles of the teeth of the gear train.

Another advantage of devices constructed according to my invention is that by mounting the transmissions directly on the drive shaft several friction points are eliminated thus resulting in an increase of efficiency of the transmission over the transmissions known to the art.

Still another advantage of my invention is the elimination of the parts hitherto believed necessary such as the jack shafting, the extra chains and sprockets and the final drive shaft and the housings and bearings for these elements.

Still another advantage of devices constructed according to my invention is that the shocks of changing gears, of starting and stopping, and of driving are absorbed by the nose suspension means.

Another advantage is that the clutch may be exposed for re-facing by disconnecting the universal joint of the in-drive shaft and removing the clutch housing.

Furthermore, the entire transmission may be removed by removing the spring suspension bolt, the universal joints of the drive-in shaft and the pedestal binders. If it is necessary to overhaul the transmission it may be dismounted, one housing at a time, by splitting it along the parting lines of the housings at the various shafts.

Another advantage is that the drive from the prime mover to the main axle is positive without the necessity of using flexible means such as chain drives and the like. If desired side rods may be employed instead of chains for driving the front and rear wheels from the main drive shaft thus making the drive entirely a positive drive.

This is of material advantage since chain drives have certain disadvantages such as the liability to breakage of the parts of the chain due to rocks, earth and the like getting into the bearings and wearing. Furthermore, chain drives require adjustment from time to time, which becomes an important point where locomotives of this character are used in localities remote from any repair facilities.

On the locomotives known to the art it is necessary to adjust the spacing of the main axle from the transmission to compensate for wear in the chain drive while with my transmission no adjustment of this character is necessary on the main axle.

The fact that a positive drive may be used becomes of material importance in applying this type of drive to larger locomotives inasmuch as the chain drive is limited by the capacity of the chains, and if larger locomotives are required additional chain drives are necessary.

A modification of my invention is to place the clutch and speed changing gearing in the clutch housing of the prime mover with the reverse and drive gearing mounted about the axle as shown and described.

Although I have described a specific embodiment of my invention it is apparent that modifications may be made by those skilled in the art and such modifications may be made without departing from the spirit and scope of my invention as set forth in the appended claims.

I claim as my invention:

1. In a locomotive, an axle, a transmission and housing mounted on the axle with the greater portion thereof extending to the rear of the axle, and means for supporting the nose of the transmission housing comprising a cap received in the nose of the transmission housing, a bolt pivotally attached to the cap by means including a pin, a pair of springs on the bolt, a threaded and adjustable cap on the bolt, and a portion of the frame of the locomotive having means thereon for receiving the bolt between the springs whereby the bolt may move up and down with reference to the frame and is resiliently restricted by the springs.

2. In a locomotive, a main frame, at least three pair of drive wheels fixed on drive shafts mounted for rotation in the frame, a prime mover mounted on the frame above the forward pair of wheels, a clutch and clutch housing mounted at the rear thereof, universal coupling means and a drive-in shaft operatively connected with the clutch to drive forward and reverse gears in a transmission case, said case mounted near its forward end on the center drive shaft, means for resiliently fastening the case at its rear end to the main frame to permit limited vertical movement, said forward and reverse gears being positioned in a substantially horizontal plane with the prime mover, a train of speed change gears adapted to be selectively engaged with the forward or reverse gears and engaged with a driven gear fixed to the center drive shaft, sprockets on all of the drive shafts, and drive chains connecting the sprockets on the center drive shaft with the other sprockets.

3. In a locomotive transmission, an axle, a transmission gear case mounted on the axle and supported thereby and extending upwardly and rearwardly therefrom, a plurality of superposed shafts and gearing in the gear case for furnishing reverse and change speed gearing, the rear nose of the gear case having means for resiliently supporting the rear of the gear case from the locomotive and the top of the gear case having an extension of the housing for receiving the first drive shaft, the first drive shaft extending forwardly through the front wall of the extension of the housing and a drive-in shaft extending forwardly over the top of the gear housing, and a prime mover located in substantially spaced relation ahead and above the axle and in substantially the same horizontal plane as the first drive shaft whereby the transmission unit is substantially supported by the axle and the prime mover is in spaced relation from the transmission to permit ready dismounting of the drive shaft and moving parts of the motor.

4. In a locomotive transmission, an axle, a gear case extending upwardly and rearwardly from the axle and mounted on the axle, the uppermost portion of the gear case being an extension above and to the rear of the main body of the gear case, a first drive shaft in this extension and extending through the forward wall thereof, a motor mounted in the locomotive above and in front of the axle and in substantially the same horizontal plane as the first drive shaft, and a relatively long drive-in shaft from the motor to the first gear drive shaft.

5. In a locomotive, a main frame, a main drive shaft and a forward drive shaft having pairs of wheels thereon mounted for rotation in the frame, a prime mover mounted on the frame above the forward pair of wheels, a clutch and clutch housing mounted at the rear thereof, universal coupling means and a drive-in shaft operatively connected with the clutch to drive forward and reverse gears in a transmission case, said case mounted near its forward end on the main drive shaft, means for resiliently fastening the case at its rear end to the main frame to permit limited vertical movement, said forward and reverse gears being positioned in a substantially horizontal plane with the prime mover, and a train of speed change gears adapted to be selectively engaged with the forward or reverse gears and engaged with a driven gear fixed to the main drive shaft.

WALDO E. RODLER.